United States Patent [19]
Kuo et al.

[11] Patent Number: 5,770,726
[45] Date of Patent: Jun. 23, 1998

[54] PROCESS FOR PREPARING A CELLLLOSE ACETOACETATE ALKANOATES

[75] Inventors: Chung Ming Kuo; Kevin Joseph Edgar, both of Kingsport, Tenn.

[73] Assignee: Eastman Chemical Company, Kingsport, Tenn.

[21] Appl. No.: 814,944

[22] Filed: Mar. 10, 1997

Related U.S. Application Data

[60] Provisional application No. 60/016,278 Apr. 24, 1996.
[51] Int. Cl.$^6$ .................................. C08B 3/06; C08B 1/02
[52] U.S. Cl. .................................. 536/69; 536/70; 536/71; 536/72; 536/73; 536/74; 536/75
[58] Field of Search ........................ 536/69, 70, 71, 536/72, 73, 74, 75

[56] References Cited

U.S. PATENT DOCUMENTS

| | | | |
|---|---|---|---|
| 2,500,029 | 3/1950 | Hagemeyer, Jr. | 18/54 |
| 2,521,897 | 9/1950 | Caldwell | 260/225 |
| 3,846,403 | 11/1974 | Gibney et al. | 536/69 |
| 4,016,353 | 4/1977 | Goheen et al. | 536/69 |
| 5,292,877 | 3/1994 | Edgar et al. | 536/63 |
| 5,360,843 | 11/1994 | Edgar et al. | 524/41 |
| 5,420,267 | 5/1995 | Edgar et al. | 536/63 |
| 5,521,304 | 5/1996 | Edgar et al. | 536/63 |

OTHER PUBLICATIONS

Staudinger and Eicher, *Makromol. Chem.*, 1953, 10, 261–279.
Kirillova and Padchenko (*Zh. Prikladnoi Khimii*, 1964, 37, 925–927).

*Primary Examiner*—Nathan M. Nutter
*Attorney, Agent, or Firm*—Betty J. Boshears; Harry J. Gwinnell

[57] ABSTRACT

The present invention relates to a process for preparing a substituted cellulose acetoacetate alkanoate without using a carboxamide/lithium chloride solvent system. The process involves contacting cellulose in a carboxylic acid diluent with an acetylating compound selected from the group consisting of a carboxylic acid anhydride and an acid chloride, an acetoacetylating compound selected from the group consisting of diketene, an alkyl acetoacetate and 2,2,6-trimethyl-4H-1,3-dioxin-4-one, and a mineral acid catalyst under conditions and in a molar ratio sufficient to cause the cellulose, acetylating compound and acetoacetylating compound to react to produce a substituted cellulose acetoacetate alkanoate.

25 Claims, No Drawings

PROCESS FOR PREPARING A CELLLLOSE ACETOACETATE ALKANOATES

This is an ORIGINAL application based on the PROVISIONAL Ser. No. 60/016,278 filed Apr. 24, 1996.

FIELD OF THE INVENTION

This invention relates to a process for preparing a substituted cellulose acetoacetate alkanoate without using a carboxamide/lithium chloride solvent system.

BACKGROUND OF THE INVENTION

Methods have been described for synthesizing cellulose esters containing acetoacetyl groups. U.S. Pat. Nos. 5,292,877, 5,360,843, 5,521,304 and 5,420,267 describe methods for preparing cellulose acetoacetate esters by solubilizing cellulose in a carboxamide/lithium chloride solvent and adding an acetoacetylating compound such as diketene or tert-butyl acetoacetate and optimally a carboxylic acid anhydride or an acid chloride. The carboxamide is either 1-methyl-2-pyrrolidinone or N,N-dimethylacetamide.

Carboxamide/lithium chloride solvent systems are disadvantageous in that the lithium chloride and carboxamides are expensive materials which on a commercial scale would require recovery and recycle. Moreover, the concentration of cellulose must be kept below about eight weight percent when using a carboxamide/lithium chloride solvent system or the viscosity of the solution becomes too high for practical purposes.

Preparation of cellulose acetoacetate alkanoates was taught by Hagemeyer (U.S. Pat. No. 2,500,029) and Caldwell (U.S. Pat. No. 2,521,897). Both patents describe the reaction of cellulose acetate and other cellulose esters with diketene in organic solvent, with catalysis by pyridine, sodium acetate, or with no catalysis. This method requires two acylations, two isolations, and potentially two hydrolysis steps, to convert cellulose to cellulose acetoacetate alkanoates. Staudinger and Eicher (*Makromol. Chem.*, 1953, 10, 261–279) taught direct conversion of cellulose to cellulose acetoacetate (DS=3.0). The one-step nature of their method was attractive, but misleading. They required regenerated cellulose for their process; therefore, it was necessary to prepare a cellulose diacetate, hydrolyze all the way back to cellulose, and then reacylate with diketene (with sodium acetate in acetic acid in their process) to obtain the desired cellulose acetoacetate. Staudinger and Eicher did not teach how to obtain partially substituted cellulose acetoacetate, nor did they teach how to obtain cellulose alkanoate acetoacetate directly from cellulose. Kirillova and Padchenko (*Zh.Prikladnoi Khimii*, 1964, 37, 925–927) teach the reaction of cellulose with diketene in acetic acid using sulfuric acid catalysis to obtain a cellulose acetoacetate. They varied the solvent mixture, the catalyst, and the reagent ratios, but were unable to achieve high degrees of substitution. They did not describe attempts to prepare cellulose acetoacetate alkanoates, but their work would lead one to think that an attempt to react cellulose with diketene and a carboxylic anhydride with mineral acid catalysis would be unsuccessful due to incomplete reaction.

SUMMARY OF THE INVENTION

Accordingly, it is an object of this invention to provide an economical process for preparing substituted cellulose acetoacetate alkanoates.

It is another object of this invention to provide a process for preparing substituted cellulose acetoacetate alkanoates which avoids the use of a carboxamide/lithium chloride solvent system.

A further object of this invention is to provide a process for preparing partially substituted cellulose acetoacetate alkanoates in which the degree of substitution of alkanoyl and the degree of substitution of acetoacetyl may be independently controlled.

With regard to the foregoing and other objects, the present invention provides a process for preparing a substituted cellulose acetoacetate alkanoate comprising contacting cellulose in a carboxylic acid diluent with an acetylating compound selected from the group consisting of a carboxylic acid anhydride and an acid chloride, (provided that the acid chloride is employed in combination with an acid acceptor), an acetoacetylating compound selected from the group consisting of diketene, an alkyl acetoacetate and 2,2,6-trimethyl-4H-1,3-dioxin-4-one, and a mineral acid catalyst under conditions and in a molar ratio sufficient to cause the cellulose, acetylating compound and acetoacetylating compound to react to produce a substituted cellulose acetoacetate alkanoate.

In accordance with one embodiment of the present invention, the process is carried out until a substituted cellulose acetoacetate alkanoate having a degree of substitution of 2.7 to 3.0 is prepared. The substituted cellulose acetoacetate alkanoate is then hydrolyzed.

The substituted cellulose acetoacetate alkanoates prepared by the process of the present invention are dispersible in water with added organic cosolvents but without other dispersing aids and form low viscosity dispersions even at cellulose ester concentrations of greater than 15 weight percent. The substituted cellulose acetoacetate alkanoates are crosslinkable and may be formulated into coatings.

DETAILED DESCRIPTION OF THE INVENTION

The invention relates to a process for preparing a substituted cellulose acetoacetate alkanoate. The process involves contacting cellulose in a carboxylic acid diluent with an acetylating compound, an acetoacetylating compound and a mineral acid catalyst under conditions and in a molar ratio sufficient to cause the cellulose, acetylating compound and acetoacetylating compound to react to produce a substituted cellulose acetoacetate alkanoate. After formation of the substituted cellulose acetoacetate alkanoate, the product may be isolated and by-products which are present may be removed by addition of a nonsolvent. In another embodiment of the present invention, the substituted cellulose acetoacetate alkanoate is hydrolyzed to a lower degree of substitution prior to isolation.

A wide variety of sources of cellulose may be used in the process of the present invention. The cellulose is preferably first mixed with water to activate the cellulose. The water and cellulose mixture is then contacted with a carboxylic acid to cause the cellulose to associate with the carboxylic acid by means of a solvent exchange which provides the cellulose and carboxylic acid mixture for the reaction. Suitable sources of cellulose include hardwood pulp, softwood pulp, cotton linters, regenerated cellulose and bacterial cellulose which have been treated to substantially remove impurities such as lignin and the like.

The carboxylic acid is preferably an aliphatic carboxylic acid having 1 to 26 carbon atoms terminating in a carboxyl group and may be either saturated or unsaturated. Examples of carboxylic acids include valeric acid, acetic acid, butyric acid, propionic acid, capric acid, hexanoic acid, and nonanoic acid. Acetic acid is particularly preferred for use as the diluent in the practice of the invention.

The acylating compound is selected from the group consisting of a carboxylic acid anhydride and an acid chloride provided that in the case of the acid chloride an acid acceptor is also used. Combinations of a carboxylic acid anhydride and an acid chloride or combinations of carboxylic acid anhydrides or acid chlorides may also be used as the acylating compound(s).

The carboxylic acid anhydride has from 4 to 26 carbon atoms, preferably from 4 to 20 carbon atoms, and even more preferably, from 4 to 8 carbon atoms. The carboxylic acid anhydride may contain more than one carboxylic acid group such as mixed anhydrides. Examples of carboxylic acid anhydrides include acetic anhydride, propionic anhydride, butyric anhydride, nonanoic anhydride, hexanoic anhydride, undecylic anhydride, lauric anhydride, palmitic anhydride, stearic anhydride, oleic anhydride, and linoleic anhydride. Acetic anhydride is especially preferred in the practice of the present invention.

Examples of acid chlorides include acetyl chloride, propionyl chloride, butyryl chloride, hexanoyl chloride, lauroyl chloride and stearoyl chloride. The acid chloride is used in combination with an acid acceptor. Examples of acid acceptors include pyridine, sodium bicarbonate and sodium acetate.

The acetoacetylating compound is selected from the group consisting of diketene, 2,2,6-trimethyl-4H-1,3-dioxin-4-one and an alkyl acetoacetate wherein the alkyl group is straight chain or branched and has 1 to 18 carbon atoms. A preferred alkyl acetoacetate is tert-butyl acetoacetate because it generates the reactive intermediate acetylketene at a high rate.

Examples of mineral acid catalysts include sulfuric acid, methanesulfonic acid, and perchloric acid. A preferred mineral acid catalyst is sulfuric acid. The mineral acid catalyst may be added in the form of a solution with a carboxylic acid.

The substituted cellulose acetoacetate alkanoate prepared by the process of the present invention has the structure:

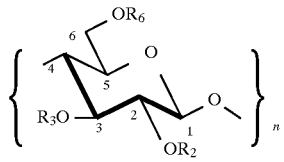

In the above structure, $R^2$, $R^3$ and $R^6$ are independently selected from the group consisting of hydrogen, acetoacetyl and $R^1C=O$, with the proviso that least one of $R_2$, $R_3$ and $R_6$ is acetoacetyl and at least one of $R_2$, $R_3$ and $R_6$ is acyl. Examples of alkyl groups include methyl, ethyl, propyl, pentyl, nonanyl, dodecanyl, 2-propyl 2-methyl-2-propyl, and 2-butyl. Preferably, the alkyl group is methyl.

$R^1$, as mentioned above, is selected from the group consisting of an alkyl or branched alkyl having 1 to 20 carbon atoms, phenyl, naphthyl, an alkenyl or branched alkenyl having 1 to 20 carbon atoms.

The substituted cellulose acetoacetate alkanoate has a total degree of substitution (which is the sum of the degree of substitution of acetoacetyl groups and acetyl groups per anhydroglucose units (DS/AGU)) of 0.1 to 3.0. Preferably, the substituted cellulose acetoacetate alkanoate has a degree of substitution of 2.0 to 3.0, more preferably 2.1 to 2.8. The substituted cellulose acetoacetate alkanoate has a weight average molecular weight ($M_w$) from about 20,000 to about 1,000,000, and an inherent viscosity (I.V.) from 0.1 to 1.5 dL/g, preferably from 0.2 to 0.6 dL/g.

Purification of the substituted cellulose acetoacetate alkanoate is accomplished by contacting the solution of substituted cellulose acetoacetate alkanoate which may be present with by-products with a nonsolvent to isolate the substituted cellulose acetoacetate alkanoate. The nonsolvent can be any solvent in which the starting materials (other than cellulose) and by-products are miscible but in which the substituted cellulose acetoacetate alkanoate product is insoluble. Examples of nonsolvents include water, methanol, ethanol, and 2-propanol. Preferably, the nonsolvent is water. The amount of nonsolvent is generally at least about 900 percent, based on the weight of nonsolvent, per weight of cellulose starting material.

The substituted cellulose acetoacetate alkanoate product may be separated from the nonsolvent by methods known in the art such as filtration, drying, decantation and washing to result in a substantially pure substituted cellulose acetoacetate alkanoate. The separation step may be repeated until the desired purity is obtained.

The order of addition of the acetylating compound, acetoacetylating compound and a mineral acid catalyst can be varied. Any of the compounds can be added first to the combination of cellulose and carboxylic acid diluent or they can be added simultaneously or as a premixture. It should be noted, however, that changing the order of addition may change the position of substitution of acetoacetyl groups and acetyl groups.

The molar ratio of cellulose to anhydride is preferably, 1:1 to 1:6, more preferably, 1:2 to 1:4.

The molar ratio of cellulose to diketene is preferably, 1.0:0.1 to 1.0:5.0, more preferably, 1:1 to 1.0:3.0.

The weight ratio of catalyst is preferably 0.05–0.5 parts, and more preferably, 0.1–0.3 parts catalyst to 1 part of cellulose.

The weight ratio of carboxylic acid is preferably 3–10 parts, and more preferably, 4–6 parts catalyst to 1 part of cellulose.

Preferably, the cellulose in a carboxylic acid diluent is contacted with the acetylating compound to form a mixture which is cooled, if necessary, to a temperature of from 0° C. to 25° C. The acetoacetylating compound and the mineral acid catalyst are then added to the mixture. The temperature is increased to a temperature of from 50° C. to 160° C. to cause the cellulose, acetylating compound and acetoacetylating compound to react to produce a substituted cellulose acetoacetate alkanoate.

The process is carried out over a period of time sufficient to produce the desired substituted cellulose acetoacetate alkanoate in adequate yield. Reaction times are influenced to a significant degree by the reactants, the reaction temperature, the concentration and choice of reactants, the choice and concentration of reactant solvent and by other factors known to those skilled in the art.

In another embodiment of the present invention, the cellulose acetoacetate alkanoate product having a relatively high degree of substitution in the order from about 2.7 to about 3.0 may be hydrolyzed to cellulose acetoacetate alkanoates having a lower degree of substitution by the addition of water. A catalyst may optionally be used to increase the rate of hydrolysis, or the catalyst remaining from acetylation may be neutralized in order to favor acetoacetate hydrolysis.

Significant control may be exerted in the hydrolysis process over the proportion of acetoacetate and alkanoate in the product. For example, high temperature hydrolysis in the absence of a catalyst favors low acetoacetyl content and retention of alkanoate ester groups. Low temperature hydrolysis in the presence of a mineral acid catalyst favors low alkanoyl and higher acetoacetyl content. This selectivity is observed because loss of acetoacetyl is a unimolecular process which is accelerated by higher temperature. Conversely, cellulose alkanoate hydrolysis is a bimolecular process, where water is the nucleophile, which is accelerated by mineral acid catalysis.

The substituted cellulose acetoacetate alkanoates prepared by the process of the present invention are dispersible in water with added organic cosolvents without the need for other dispersing aids, and form low viscosity dispersions even at cellulose concentrations of greater than 15 weight percent. The substituted cellulose acetoacetate alkanoates are crosslinkable and may be formulated into coatings.

The following nonlimiting examples illustrate further the practice of the invention.

EXAMPLES

In the following examples, the cellulose was activated by soaking NATCHEZ HVX, which is hardwood cellulose pulp available from International Paper, or SULFATATE HJ, which is hardwood cellulose pulp available from Rayonier, in distilled water, followed by three solvent exchanges with a carboxylic acid diluent. The cellulose and carboxylic acid diluent formed a slurry which was added to a 500 mL three-neck round bottom flask equipped with a mechanical stirrer, thermometer and nitrogen inlet. The slurry was cooled to 5° C. and a carboxylic anhydride and diketene were added to form a mixture. As used herein, "equivalents" refers to equivalents of reagent per anhydroglucose unit of cellulose.

A mineral acid catalyst in the form of a solution in the carboxylic acid diluent was added to the mixture and the temperature was held at about 5° C. to about 10° C. for 30 minutes. The mixture was allowed to warm to about 23° C. before being heated to the specified reaction temperature and held at that temperature until a clear solution was obtained. The solution was cooled to about 20° C. to 40° C.

When no hydrolysis was intended, or when selective hydrolysis of acetoacetate groups was intended, an amount of magnesium acetate sufficient to neutralize the catalyst was added to the clear solution. The magnesium acetate was dissolved in a mixture of water and carboxylic acid.

When hydrolysis to a substituted cellulose acetoacetate alkanoate was intended, the water content of the solution was adjusted to about 6 to about 16 weight % by adding the specified amount of a mixture of water, carboxylic acid diluent, and in some cases sulfuric acid catalyst. Hydrolysis was carried out at a temperature of about 40° C. to about 90° C., for the specified amount of time with 0 to about 1.0 weight % of sulfuric acid catalyst to form a reaction mixture.

The substituted cellulose acetoacetate alkanoate product was isolated by adding the reaction mixture dropwise to water with strong agitation. The product was washed with a nonsolvent and dried in a vacuum oven under nitrogen at a temperature of about 40° C. to about 60° C.

The testing procedures used for the results shown herein are as follows:

The degree of substitution for the anhydroglucose unit of cellulose (DS/AGU) was determined by $^1H$ NMR in d-6 dimethyl sulfoxide (DMSO). The dimethyl sulfoxide contained several drops of trifluoroacetic acid in order to shift any hydroxyl protons downfield.

Inherent Viscosity (I.V.) was measured at 25° C. using 0.25 grams of polymer per 100 ml of a solvent consisting of 60% by weight phenol and 40% by weight tetrachloroethane. Inherent viscosity is reported in dL/g.

Infrared spectroscopy was used to confirm the identity of the substituted cellulose acetoacetate alkanoate products.

EXAMPLE 1

Reagents set forth below were subjected to the procedure described above. The results are summarized in Table 1.

| | |
|---|---|
| Cellulose | Natchez HVX |
| Parts | 1 |
| Carboxylic Acid Diluent | Acetic Acid |
| Parts | 8 |
| Carboxylic Anhydride | Acetic anhydride |
| Equiv | 3.0–5.5 |
| Equiv Diketene | 1.0–3.5 |
| Sulfuric Acid (Parts) | 0.185 |
| Reaction Temperature | 60° C. |
| Nonsolvent | Water |
| Washing | 4 × 100 parts water |
| Hydrolysis | None |

TABLE 1

| Diketene/Anhydride (Equiv/Equiv) | Acetoacetyl (DS) | Acetyl (DS) | I.V. |
|---|---|---|---|
| 1.0/5.5 | 0.39 | 2.45 | 0.33 |
| 2.0/4.5 | 0.61 | 2.30 | 0.31 |
| 2.5/4.0 | 0.71 | 2.11 | 0.30 |
| 3.5/3.0 | 0.97 | 1.54 | 0.45 |

The results in Table 1 demonstrate that the substituted cellulose acetate acetoacetate product having the desired degree of substitution may be synthesized directly from cellulose.

EXAMPLE 2

Reagents set forth below were subjected to the procedure described above. The results are summarized in Table 2.

| | |
|---|---|
| Cellulose | Sulfatate HJ |
| Parts | 1 |
| Carboxylic Acid Diluent | Butyric Acid |
| Parts | 10 |
| Carboxylic Anhydride | Butyric anhydride |
| Equiv | 4.0 |
| Equiv Diketene | 0.75–2.3 |
| Sulfuric Acid (Parts) | 0.10 |
| Reaction Temperature | 60° C. |
| Nonsolvent | Water |
| Washing | 4 × 100 parts water |
| Hydrolysis | None |

TABLE 2

| Diketene/Anhydride (Equiv/Equiv) | Acetoacetyl (DS) | Butyryl (DS) | I.V. |
|---|---|---|---|
| 2.3/4.0 | 1.36 | 1.60 | 0.29 |
| 1.5/4.0 | 1.01 | 1.64 | 0.30 |
| 0.75/4.0 | 0.67 | 2.07 | 0.40 |

The results in Table 2 demonstrate that the substituted cellulose acetoacetate butyrate product having the desired degree of substitution may be synthesized directly from cellulose.

EXAMPLE 3

Reagents set forth below were subjected to the procedure described above. The results are summarized in Table 3.

| | |
|---|---|
| Cellulose | Natchez HVX |
| Parts | 1 |
| Carboxylic Acid Diluent | Acetic Acid |
| Parts | 5 |
| Carboxylic Anhydride | Acetic anhydride |
| Equiv | 4.0 |
| Equiv Diketene | 3.5 |
| Sulfuric Acid (Parts) | 0.20 |
| Reaction Temperature | 60° C. |
| Hydrolysis: | |
| Temperature | 55° C. |
| Hydrolysis Medium | 12 Wt % Water in Acetic Acid |
| Parts | 13 |
| Catalyst | 0.3 Wt % Sulfuric Acid |
| Nonsolvent | Water |
| Washing | 4 × 100 parts water |

TABLE 3

| Hydrolysis Time (hours) | Acetoacetyl (DS) | Acetyl (DS) | I.V. (dL/g) |
|---|---|---|---|
| 0 | 0.84 | 1.83 | 0.45 |
| 2 | 0.78 | 1.77 | 0.34 |
| 4 | 0.75 | 1.71 | 0.32 |
| 6 | 0.72 | 1.68 | 0.31 |
| 8 | 0.73 | 1.50 | 0.32 |

The results in Table 3 demonstrate control of the proportion of acetate and acetoacetate in the product by hydrolysis; acid-catalyzed, low-temperature hydrolysis favors removal of acetate and results in little removal of acetoacetate from the product.

EXAMPLE 4

Reagents set forth below were subjected to the procedure described above. The results are summarized in Table 4.

| | |
|---|---|
| Cellulose | Natchez HVX |
| Parts | 1 |
| Carboxylic Acid Diluent | Acetic Acid |
| Parts | 5 |
| Carboxylic Anhydride | Acetic anhydride |
| Equiv | 4.0 |
| Equiv Diketene | 3.5 |
| Sulfuric Acid (Parts) | 0.20 |
| Reaction Temperature | 60° C. |
| Hydrolysis: | |
| Temperature | 85° C. |
| Hydrolysis Medium | 12 Wt % Water in Acetic Acid |
| Parts | 13 |
| Catalyst | None (Sulfuric acid remaining from acylation was neutralization with Mg(OAc)2) |
| Nonsolvent | Water |
| Washing | 4 × 100 parts water |

TABLE 4

| Hydrolysis Time (hours) | Acetoacetyl (DS) | Acetyl (DS) | I.V. |
|---|---|---|---|
| 0 | 0.84 | 1.83 | 0.45 |
| 2 | 0.65 | 1.82 | 0.47 |
| 4 | 0.57 | 1.79 | 0.47 |
| 6 | 0.47 | 1.77 | 0.46 |
| 8 | 0.42 | 1.76 | 0.41 |

The results in Table 4 demonstrate control of the proportion of acetate and acetoacetate in the product by hydrolysis with no mineral acid catalyst at high temperature which favors removal of acetoacetate and results in little removal of acetate from the product.

EXAMPLE 5

Preparation of an aqueous dispersion of cellulose acetate acetoacetate.

Ten grams of the cellulose acetate acetoacetate prepared in Example 3 having a DS(acetyl)=1.83, DS(acetoacetyl)= 0.84 and I.V.=0.45, was dissolved in 10 grams of cyclohexanone in a container equipped with a mechanical stirrer to form a mixture. Distilled water, 35 grams, was slowly added to the mixture while applying vigorous agitation. The resulting mixture was a stable, liquid, film-forming aqueous dispersion of cellulose acetate acetoacetate.

The results of Example 5 demonstrate that cellulose acetoacetate esters are useful as additives or film-formers in reduced-VOC waterborne coatings, including waterborne dispersion and emulsion types.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

What is claimed is:

1. A process for preparing a substituted cellulose acetoacetate alkanoate comprising contacting cellulose in a carboxylic acid diluent with an acetylating compound selected from the group consisting of a carboxylic acid anhydride and an acid chloride, provided that the acid chloride is employed in combination with an acid acceptor, an acetoacetylating compound selected from the group consisting of diketene, an alkyl acetoacetate and 2,2,6-trimethyl-4H-1,3-dioxin-4-one, and a mineral acid catalyst under conditions and in a molar ratio sufficient to cause the cellulose, acetylating compound and acetoacetylating compound to react to produce a substituted cellulose acetoacetate alkanoate.

2. The process of claim 1 wherein the substituted cellulose acetoacetate alkanoate has a total degree of substitution of acetoacetyl groups and acetyl groups per anhydroglucose units of about 0.1 to about 3.0.

3. The process of claim 1 wherein the reaction is conducted at a temperature of from 20° C. to 160° C.

4. The process of claim 3 wherein the reaction is conducted at a temperature from 50° C. to 90° C.

5. The process of claim 1 wherein the cellulose is derived from cellulose sources selected from the group consisting of hardwood pulp, softwood pulp, cotton linter, regenerated cellulose and bacterial cellulose.

6. The process of claim 5 wherein the cellulose is derived from hardwood pulp.

7. The process of claim 1 wherein the carboxylic acid diluent is selected from the group consisting of valeric acid, acetic acid, butyric acid, propionic acid, capric acid, hexanoic acid, and nonanoic acid and combinations thereof.

8. The process of claim 7 wherein the carboxylic acid diluent is acetic acid.

9. The process of claim 1 wherein the carboxylic acid anhydride has 8 to 20 carbon atoms.

10. The process of claim 1 wherein the carboxylic acid anhydride is selected from the group consisting of acetic anhydride, propionic anhydride, butyric anhydride, nonanoic anhydride, hexanoic anhydride, undecylic anhydride, lauric anhydride, palmitic anhydride, stearic anhydride, oleic anhydride, and linoleic anhydride, and combinations thereof.

11. The process of claim 10 wherein the carboxylic acid anhydride is acetic anhydride.

12. The process of claim 1 wherein the acetoacetylating compound is tert-butyl acetoacetate.

13. The process of claim 1 wherein the mineral acid catalyst is selected from the group consisting of sulfuric acid, methanesulfonic acid, perchloric acid, and combinations thereof.

14. The process of claim 13 wherein the mineral acid catalyst is sulfuric acid.

15. The process of claim 1 wherein following the reaction the mineral acid catalyst is neutralized.

16. The process of claim 15 wherein the neutralizing agent is selected from the group consisting of magnesium acetate, sodium acetate, magnesium carbonate, sodium carbonate, sodium bicarbonate, sodium hydroxide, and magnesium hydroxide.

17. The process of claim 15 further comprising hydrolyzing the substituted cellulose acetoacetate alkanoate in the absence of mineral acid catalyst to effect selective hydrolysis of acetoacetate groups.

18. The process of claim 1 further comprising hydrolyzing the cellulose acetoacetate alkanoate in the presence of mineral acid to effect selective hydrolysis of the alkanoate groups.

19. The process of claim 17 wherein the substituted cellulose acetoacetate alkanoate is hydrolyzed by adding water to the solution and holding for a specified time and temperature.

20. The process of claim 18 wherein the hydrolysis is conducted at a temperature of from 40° C. to 90° C.

21. The process of claim 1 wherein upon formation of the substituted cellulose acetoacetate alkanoate there remains unreacted starting material would have to be removed by filtration prior to addition of the nonsolvent by-products, said process further comprising a purification step which includes contacting the substituted cellulose acetoacetate alkanoate with a nonsolvent to isolate the substituted cellulose acetoacetate alkanoate.

22. The process of claim 21 wherein the nonsolvent is selected from the group consisting of acetone, water, methanol, ethanol and 2-propanol.

23. The process of claim 21 wherein the substituted cellulose acetoacetate alkanoate is separated from the nonsolvent by methods selected from the group consisting of filtration, drying, decantation and washing (filter-wash-dry would be normal).

24. The process of claim 1 wherein the substituted cellulose acetoacetate alkanoate has repeating units of the structure

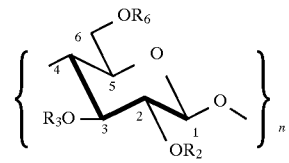

wherein $R^2$, $R^3$ and $R^6$ are independently selected from the group consisting of hydrogen, acetoacetyl and $R^1C=O$, provided that at least one of $R^2$, $R^3$ and $R^6$ is an acetoacetyl and at least one of $R^2$, $R^3$ and $R^6$ is an alkanoyl; $R^1$ is selected from the group consisting of an alkyl or branched alkyl having 1 to 20 carbon atoms, an alkenyl or branched alkenyl having 1 to 20 carbon atoms, phenyl and naphthyl.

25. A process for preparing a substituted cellulose acetoacetate alkanoate comprising:

(I) contacting cellulose in a carboxylic acid diluent with an acetylating compound selected from the group consisting of a carboxylic acid anhydride and an acid chloride to form a mixture, provided that the acid chloride is employed in combination with an acid acceptor;

(II) with the mixture of Step I at a temperature of from 0° C. to about 25° C. adding an acetoacetylating compound selected from the group consisting of diketene, an alkyl acetoacetate and 2,2,6-trimethyl-4H-1,3-dioxin-4-one and a mineral acid catalyst to the mixture; and (III) heating the mixture of Step (II) to a temperature of from about 50° C. to about 160° C. to cause the cellulose, acetylating compound and acetoacetylating compound to react to produce a substituted cellulose acetoacetate alkanoate.

* * * * *